United States Patent Office 3,385,873
Patented May 28, 1968

3,385,873
SULFATE ESTERS OF HINDERED ALCOHOLS
John R. Caldwell, Kingsport, Tenn., assignor to Eastman Kodak Company, Rochester, N.Y., a corporation of New Jersey
No Drawing. Filed Oct. 17, 1963, Ser. No. 317,038
23 Claims. (Cl. 260—400)

This invention relates to novel sulfate esters of hindered alcohols of the neopentyl type and more particularly to sulfate and acid sulfate esters of neopentyl type alcohol derivatives containing a carboxylic acid ester group which, because of properties inherent in the neopentyl structure, are particularly valuable for use under conditions that tend to promote hydrolytic or thermal decomposition.

Water soluble alkyl sulfate salts have been proposed for use as surface active agents, additives for synthetic lubricants, etc., and other uses. One particular class proposed in the prior art is represented by the acid sulfate derivatives of the partial esters of glycols and glycerin. It is well known that the acid sulfate esters of these prior art glycol and glycerin derivatives are relatively unstable toward hydrolysis and thermal decomposition making them generally unsuited for such uses as wetting agents, extreme pressure lubricants, and plasticizers under extreme conditions. As will be more fully set forth hereinafter, after extended investigation I have found that by treating certain neopentyl alcohol derivatives with suitable sulfating agents, neutral and acidic esters are formed which are highly stable toward both hydrolysis and thermal decomposition and accordingly are appropriate for the aforementioned uses.

This invention has as an object to provide novel sulfate esters having a highly hindered or blocked structure which greatly reduces their hydrolysis rate and also renders them resistant to thermal decomposition.

A further object is to provide novel compounds that contain within their structure a sulfate group and a carboxylic acid group both of which are derived from neopentyl hydroxyl groups.

A still further object is to provide such compounds which, because of their thermal and hydrolytic stability, are especially useful as wetting agents, extreme pressure lubricants, additives for increasing the lubricity of synthetic lubricants, surfactants, emulsifying agents, degreasing agents and plasticizers and the like.

A still further object is to provide neutral esters from alcohols having a neopentyl structure which are valuable as plasticizers, hydraulic fluids, selective solvents and synthetic lubricants.

Another object is to provide acid sulfate esters from alcohols having a neopentyl structure which are valuable as catalysts, surface active agents and as additives for extreme pressure lubricants.

Another object is to provide salts of acid sulfate esters from alcohols having neopentyl structure useful as surfactants and components of high temperature lubricants.

Another object is to provide neutral and acid sulfate esters which are valuable as extractants and selective solvents for purifying and concentrating compounds of uranium and other metals.

Another object is to provide acid sulfate esters which have particular value in the concentration of ores by the flotation process.

The above stated objects are accomplished by our invention which involves the provision of sulfate and acid sulfate esters of a neopentyl alcohol that contains in its structure a carboxylic ester group. Such compounds may be represented by the following structural formulae.

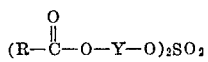

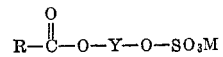

wherein R is a substituent selected from the group consisting of straight and branched chain radicals containing from 1–20 carbon atoms, cycloalkyl radicals containing from 5–12 carbon atoms, aryl and alkylated aryl groups containing 6–10 carbon atoms, and wherein Y is selected from the group consisting of

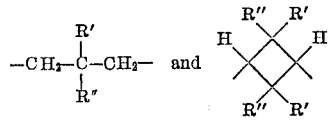

wherein R' and R" are alkyl groups containing 1–4 carbon atoms and wherein M is an ion selected from the class consisting of hydrogen, the alkali metals, the alkaline earth metals and amines.

The neopentyl alcohol derivatives used in preparing the compounds of the invention are obtained by esterifying one hydroxy group of a neopentyl glycol with a carboxylic acid or a suitable carboxylic acid derivative. These half esters are conveniently made by heating one mole of the carboxylic acid with 3–5 moles of the glycol and removing excess glycol by distillation or solvent treatment. These hydroxyl-containing esters can be used for the production of both acid sulfates and neutral sulfate derivatives.

The acid sulfate derivatives are prepared by well known methods employing sulfur trioxide, fuming sulfuric acid, concentrated sulfuric acid or chlorosulfonic acid as the sulfating agent.

The neutral sulfate derivatives are also prepared by well known methods such as treatment with sulfuryl chloride, excess sulfur trioxide or fuming sulfuric acid.

The preparation of the acid sulfate derivatives may be represented by the equation

wherein R is a substituent selected from the group consisting of straight and branched chain radicals containing from 1–20 carbon atoms, cycloalkyl radicals containing from 5–12 carbon atoms, aryl and alkylated aryl groups containing 6–10 carbon atoms, and wherein Y is selected from the group consisting of

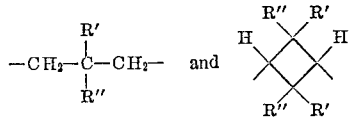

wherein R' and R" are alkyl groups containing 1–4 carbon atoms.

This class of compounds can be converted to salts of the structure

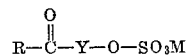

wherein R, Y and and M are as indicated by reaction of the acid sulfate with metal hydroxides such as sodium, potassium and lithium hydroxides, metal oxides such as calcium, magnesium, and zinc oxides and amines such as mono-, di- and tributyl amine, monoethanol amine, triethanol amine, dodecyl amine, and the like.

The preparation of the neutral sulfate esters may be represented by the equation

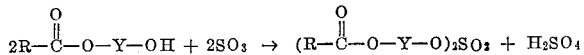

wherein R is a substituent selected from the group consisting of straight and branched chain radicals containing from 1–20 carbon atoms, cycloalkyl radicals containing from 5–12 carbon atoms, aryl and alkylated aryl groups containing 6–10 carbon atoms, and wherein Y is selected from the group consisting of

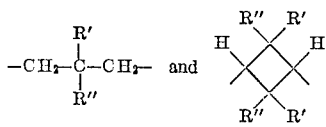

wherein R' and R" are alkyl groups containing 1–4 carbon atoms.

In the following examples and description I have set forth several of the preferred embodiments of my invention but they are included merely for purposes of illustration and not as a limitation thereof.

Example I

One molecular proportion of single pressed stearic acid and 4 molecular proportions of 2,2-dimethyl-1,3-propanediol were heated at 210–220° C. until the acid number was less than 2.0. A trace of titanium butoxide was used as catalyst. The product was washed several times with hot water to remove excess glycol, and dried by heating at 90–100° C. in vacuum. It was a soft wax that melted at about 40–45° C.

One molecular proportion of the ester was dissolved in an equal weight of ethylene dichloride and one molecular proportion of sulfur trioxide was added, while the temperature was maintained at about 0° C. The solution was then stirred for 30 minutes at 0° to 10° C. and allowed to warm up to room temperature. The acid sulfate was neutralized by adding one molecular proportion of monoethanolamine, while the temperature was kept below 30° C. The ethylene dichloride was removed in vacuum at 30–40° C. The product was a hard wax that dissolved readily in water. It was a powerful wetting and emulsifying agent.

The sodium and potassium salts were also strong surfactants. The tributylamine salt was useful as an additive for lubricating oils. All of the salts showed excellent stability in hot water and there was no evidence of hydrolysis.

Example II

One molecular proportion of technical lauric acid and 4 molecular proportions of 2,2-dimethyl-1,3-propanediol were heated at 210–220° until the acid number was about 1.0. A trace of titanium isopropoxide was used as catalyst. The product was isolated and converted to the acid sulfate as described in Example I. The acid sulfate was converted to the sodium salt by neutralization with sodium carbonate. The salt was a strong surface tension depressant.

Example III

The monolauric ester of 2,2-diethyl-1,3-propanediol was prepared as described above. It was converted to the acid sulfate with 30 percent fuming sulfuric acid. The crude product was neutralized with an aqueous solution of sodium carbonate. The resulting solution contained sodium sulfate along with the sodium salt of the sulfate ester. The solution was useful as an industrial detergent.

The sodium salt is especially valuable as a surfactant and emulsifying agent for use in strongly alkaline solutions. For example, an emulsion was prepared by mixing 15 g. of the sodium salt, 85. g. of kerosene, 10 g. of sodium hydroxide, and 500 cc. of water in a high speed colloid mill. The emulsion was useful as a degreasing agent. Although the emulsion has a pH of 12–13, the sulfate ester showed no evidence of hydrolysis, even after standing 48 hours.

Example IV

One molecular proportion of isobutyric anhydride was heated with 5 molecular proportions of 2,2-dimethyl-1,3-propanediol at 80–100° C. for 12 hours, using a trace of pyridine as catalyst. The product was washed with hot water to remove isobutyric acid and excess glycol.

The monoisobutyrate of 2,2-dimethyl-1,3-propanediol was treated with one molecular equivalent of sulfur trioxide to give the acid sulfate. The product was useful as an ore flotation agent.

Example V

One molecular proportion of lauric acid and 4 molecular proportions of 2,2,4,4-tetramethylcyclobutane-1,3-diol were heated at 210–220° C. until the acid number was less than 2.0. A trace of titanium butoxide was used as catalyst. The product was washed several times with hot water to remove excess glycol, and dried by heating at 90–110° C. in vacuum.

The glycol monolaurate was treated with $SO_3$ as described in Example I to form the acid sulfate which was neutralized with sodium carbonate. The sodium salt was a powerful wetting and emulsifying agent. It showed excellent stability toward hydrolysis in hot water.

The N,N-diethylcyclohexylamine salt was useful as an additive for lubricating oils. It had exceptional stability toward thermal and hydrolytic decomposition.

Example VI

The monobenzoate of 2,2,4,4-tetramethylcyclobutane-1,3-diol was prepared by heating one molecular proportion of benzoic acid with 4 molecular proportions of the glycol using titanium butoxide as catalyst. The excess glycol was removal by washing with hot water. The monobenzoate was treated with two molecular proportions of sulfur trioxide to form the neutral sulfate ester (see Organic Chemistry by Karrer, 1938, page 101). The ester was useful as a plasticizer. It had good resistance to hydrolysis.

Example VII

One molecular proportion of technical palmitic acid and 4 molecular proportions of 2,2,4,4-tetramethylcyclobutanediol-1,3 were heated at 200–210° C. for 3–4 hours, using a trace of dibutyltin diacetate as catalyst. The acid number was less than 2. The mixture was then washed with hot water to remove excess glycol and dried by heating in vacuum at 70–80°. Th ester was a wax that softened at 40–50°. The product was principally the monopalmitate of 2,2,4,4-tetramethylcyclobutanediol.

382 g. (1.0 mole) of the monopalmitate ester was dissolved in 1000 ml. of ethylene dichloride. The solution was stirred at about 10° and a mixture of dry air and sulfur trioxide vapors was passed into the solution. The reaction was continued until approximately 80 g. (1.0 mole) of sulfur trioxide had reacted. The product was the acid sulfate having the structure

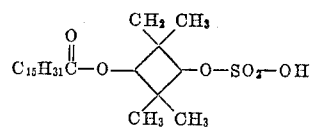

A. Part of the product was neutralized to a pH of 7.0–7.5 by the addition of aqueous sodium carbonate solution to the ethylene dichloride solution. The sodium salt was isolated by evaporating the ethylene dichloride and water. The product was a wax. It gave a soapy dispersion in water and was a powerful wetting agent. It was particularly valuable as a wetting agent in strongly alkaline solutions because of its high resistance to hydrolysis.

Fifteen parts of the sodium salt, 85 parts of kerosene, 10 g. of sodium hydroxide and 500 cc. of water were mixed in a colloid mill to form an emulsion useful for degreasing operations. Even though the pH of the solution was 12–13, there was no evidence of hydrolysis after 48 hours.

B. Part of the product was neutralized to a pH of 7.0–7.5 by the addition of N,N-diethylcyclohexylamine.

The salt was isolated by evaporating the ethylene dichloride. This salt is valuable for increasing the lubricity of petroleum oils for use in extreme pressure applications. An extreme pressure lubricant was made by mixing 2 parts of the sulfate salt and 5 parts of technical lauryl alcohol with 93 parts of mineral oil.

The sulfate salt also is of value for increasing the lubricity of synthetic lubricants. Three parts of the salt was added to 97 parts of 2,2-dimethyl-1,3-propanediol dipelargonate. The lubricity, especially under heavy load, was increased.

Example VIII

Four molecular proportions of 2,2-dimethyl-4,4-diethylcyclobutanediol-1,3 and one molecular proportion of isobutyric anhydride were heated at 100° C. for 6 hours, using a trace of pyridine as catalyst. The excess glycol and the isobutyric acid were removed by washing the product with hot water.

A. Part of the product was dissolved in ethylene dichloride and treated with two molecular proportions of sulfur trioxide to form the neutral sulfate ester

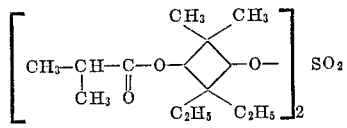

2,2-dimethyl-4,4-diethyl-3-isobutyryloxycyclobutyl sulfate

The neutral sulfate ester was useful as a selective solvent and as a plasticizer. Acrylonitrile-butadiene rubber containing 30 percent of the ester showed excellent processing characteristics.

This ester is very stable toward thermal degradation. When heated at 160° C. for 1 hour in nitrogen it showed less than 2 percent loss in weight. A related compound having the structure

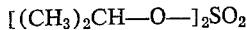

showed 20–30 percent loss in weight when heated under the same conditions. This latter compound does not have the neopentyl structure.

B. Part of the 2,2-dimethyl-4,4-diethylcyclobutanediol-1,3 was dissolved in ethylene dichloride and treated with one molecular proportion of sulfur trioxide at 0° to form the acid sulfate. The alkali metal and amine salts were valuable wetting and penetrating agents. They also were useful as ore flotation agents.

Example IX

The acid sulfate of 2,2,4,4-tetramethylcyclobutanediol-1,3-monolaurate was prepared as described in Example VIII. The sodium salt was prepared by neutralization with sodium carbonate. This compound was very stable toward alkaline hydrolysis, as shown by the following test:

A. Two g. of the product, 2 g. of sodium hydroxide and 50 cc. of water were placed in a flask. The solution was refluxed for 6 hours. A sample was taken from the flask and the excess sodium hydroxide was titrated with standard HCl. Calculation showed that the ester was approximately 3 percent hydrolyzed.

B. For comparison, the corresponding sulfate derivative of the monolaurate of diethylene glycol (an open-chain glycol) was hydrolyzed under the same conditions. It showed 93 percent hydrolysis.

These results show that the new sulfate esters are much more stable than the esters of the prior art.

As demonstrated in Example IX, the new esters of the invention possess two very important characteristics which make them more valuable than the previously known sulfate and acid sulfate esters.

(1) The structure of these compounds is such that sulfuric acid cannot be split from the molecule by simple pyrolysis to give an olefinic structure. Decomposition occurs only at temperatures that are high enough to break down the entire molecule. These temperatures are substantially higher than required to decompose the previously known sulfuric acid esters.

(2) The esters have a highly hindered or blocked structure that greatly reduces their hydrolysis rate. This resistance to hydrolysis is retained even in the acid esters.

Example X

The monolaurate ester of 2-ethyl-2-butyl-1,3-propanediol was prepared. The acid sulfate of this half ester was prepared and converted into the potassium salt as described in Example III. This salt was a powerful surfactant and was found to be stable in strongly alkaline solutions.

Example XI 2,2 - diethyl-4,4-dibutyl-1,3-cyclobutanediol was employed as described in Example IX to produce a surfactant having excellent stability in strongly alkaline solutions.

Example XII

Cyclohexanecarboxylic acid was used in place of stearic acid as in Example I. The alkali metal salts of the acid sulfate were characterized by exceptional stability in strongly alkaline solutions.

As set forth above and as indicated in the examples included herein, the new compositions of the invention find special usefulness as wetting agents, extreme pressure lubricants, additives for increasing the lubricity of synthetic lubricants, surfactants, emulsifying agents, degreasing agents, plasticizers and the like. Among the distinguishing features of these new compounds are their thermal and hydrolytic stability which derive from the unique neopentyl structure present in the molecule. Because of these outstanding stability properties the compounds of the invention are valuable for use under severe conditions which would cause extensive hydrolysis or thermal decomposition of related compounds of the prior art.

Another important property of the new compositions is their rapid degradation through biological action. It is well known that certain sulfate and sulfonate derivatives now widely used as industrial and household detergents and surfactants possess a structure that is resistant to enzymatic attack. Compounds of this type collect in the surface water of highly populated areas and cause objectionable foaming in domestic water supplies. This problem has become so acute that legislation is now being passed in many sections of the United States requiring the use of surface active agents that are readily decomposed by natural biological processes. The compositions of the present invention which contain in their molecular structure straight chain acyl radicals containing an even number of carbon atoms such as the lauroyl and stearoyl derivatives are of particular value because they fall within this biodegradable classification. Tests show that structures of this type are readily degraded into non-surface active fragments within the time limits required by current anti-pollution legislation.

Although the invention has been described in considerable detail with particular reference to certain preferred embodiments thereof, variations and modifications can be effected within the spirit and scope of the invention as described hereinabove, and as defined in the appended claims.

I claim:

1. A compound selected from the group having the formula

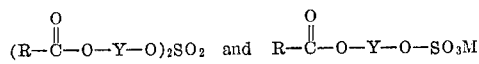

wherein R is a substituent selected from the group consisting of straight and branched chain alkyl containing from 1–20 carbon atoms, cyclohexyl and phenyl, and wherein Y is selected from the group consisting of

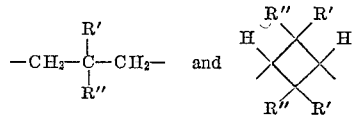

wherein R' and R'' are alkyl containing 1–4 carbon atoms and wherein M is an ion selected from the class consisting of hydrogen, alkali metal and alkylamine containing from 1–12 carbon atoms, and N,N-diethylcyclohexylamine.

2. A compound having the formula

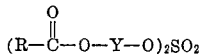

wherein R is a substituent selected from the group consisting of straight and branched chain alkyl containing from 1–20 carbon atoms, cyclohexyl and phenyl, and wherein Y is selected from the group consisting of

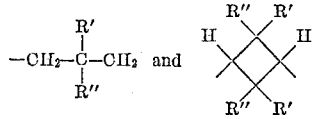

wherein R' and R'' are alkyl containing 1–4 carbon atoms.

3. A compound having the formula

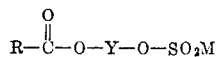

wherein R is a substituent selected from the group consisting of straight and branched chain alkyl containing from 1–20 carbon atoms, cyclohexyl and phenyl, and wherein Y is selected from the group consisting of

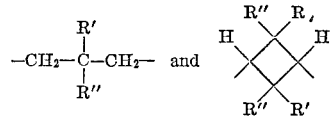

wherein R' and R'' are alkyl containing 1–4 carbon atoms and wherein M is an ion selected from the class consisting of hydrogen, alkali metal and alkyl amine containing from 1–12 carbon atoms, and N,N-diethylcyclohexyl amine.

4. A compound according to claim 3 wherein R is selected from the group consisting of straight and branched chain alkyl containing 4–10 carbon atoms.

5. A compound according to claim 3 wherein R is cyclohexyl.

6. A compound according to claim 3 wherein R is phenyl.

7. A compound according to claim 3 wherein Y is

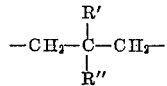

8. A compound according to claim 3 wherein R is selected from the group consisting of straight and branched chain alkyl containing 4–10 carbon atoms; and wherein Y is

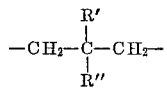

9. A compound according to claim 3 wherein R is cyclohexyl; and R is

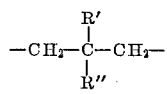

10. A compound according to claim 3 wherein R is phenyl; and wherein Y is

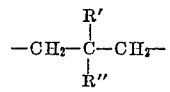

11. A compound having the formula

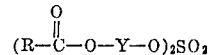

wherein R is a substituent selected from the group consisting of the straight and branched chain alkyl containing 1–11 carbon atoms and wherein Y is selected from the group consisting of

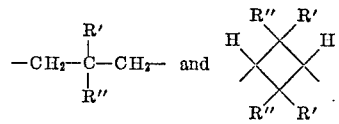

wherein R' and R'' are alkyl containing 1–4 carbon atoms.

12. A compound having the formula

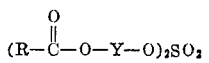

wherein R is phenyl and wherein Y is selected from the group consisting of

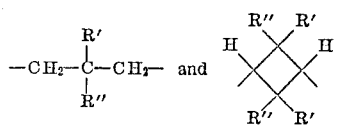

wherein R' and R'' are alkyl containing 1–4 carbon atoms.

13. A compound having the formula

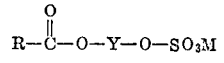

wherein R is a substituent selected from the group consisting of straight chain alkyl containing from 11–17 carbon atoms and wherein Y is selected from the group consisting of

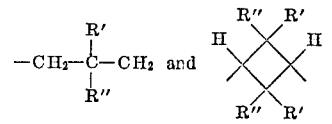

wherein R' and R'' are alkyl containing 1–4 carbon atoms and wherein M is an ion selected from the class consisting of hydrogen, alkali metal and alkyl amine containing from 1–12 carbon atoms, and N,N-diethylcyclohexylamine.

14. A compound according to claim 13 wherein Y is

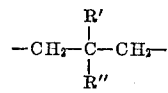

15. A compound having the formula

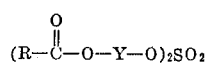

wherein R is isopropyl and wherein Y is selected from the group consisting of

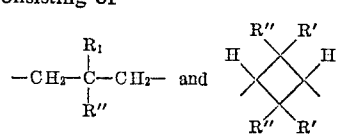

wherein R' and R'' are alkyl containing 1–4 carbon atoms.

16. 2,2 - dimethyl - 4,4-diethyl-3-isobutyryloxycyclobutyl sulfate.

17. 3-hydrogen sulfato-2,2-dimethylpropyl stearate.

18. 3-hydrogen sulfato-2,2-dimethylpropyl laurate.

19. 3 - hydrogen sulfato - 2,2,4,4 - tetramethylcyclobutyl laurate.

20. 3 - hydrogen- sulfato - 2,2,4,4-tetramethylcyclobutyl palmitate.

21. 3 - hydrogen sulfato - 2,2 - dimethylpropyl isobutyrate.

22. 3 - potassium sulfato - 2 - ethyl-2-butyl propyl laurate.

23. 3 - sodium sulfato - 2,2-dimethylpropylcyclohexanoate.

References Cited

UNITED STATES PATENTS

| | | | |
|---|---|---|---|
| 2,023,387 | 12/1935 | Harris | 260—400 X |
| 2,645,659 | 7/1953 | Morris et al. | 260—458 X |

NICHOLAS S. RIZZO, Primary Examiner.

CHARLES B. PARKER, ALEX MAZEL, Examiners.

A. SUTTO, J. H. TURNIPSEED, Assistant Examiners.

UNITED STATES PATENT OFFICE
CERTIFICATE OF CORRECTION

Patent No. 3,385,873            May 28, 1968

John R. Caldwell

It is certified that error appears in the above identified patent and that said Letters Patent are hereby corrected as shown below:

Column 7, line 71, "R" should read -- and wherein Y is --.
Column 8, lines 68 to 72, the formula should appear as shown below:

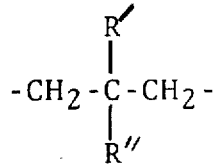

Signed and sealed this 25th day of November 1969.

(SEAL)
Attest:

Edward M. Fletcher, Jr.            WILLIAM E. SCHUYLER, JR.
Attesting Officer                     Commissioner of Patents